(12) United States Patent
Ceniza (10) Patent No.: US 11,565,880 B2
(45) Date of Patent: Jan. 31, 2023

(54) POSITIONAL SECUREMENT SYSTEM FOR A ROLLABLE CART

(71) Applicant: Toyota Motor Engineering & Manufacturing North America, Inc., Plano, TX (US)

(72) Inventor: Rommel B. Ceniza, Guelph (CA)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 529 days.

(21) Appl. No.: 16/701,825

(22) Filed: Dec. 3, 2019

(65) Prior Publication Data

US 2021/0163224 A1    Jun. 3, 2021

(51) Int. Cl.
*B65G 1/04* (2006.01)
*F16D 55/31* (2006.01)
*F16D 125/28* (2012.01)

(52) U.S. Cl.
CPC ........... *B65G 1/0492* (2013.01); *F16D 55/31* (2013.01); *F16D 2125/28* (2013.01)

(58) Field of Classification Search
CPC .. B65G 1/0492; B65G 69/005; B62B 5/0423; B62B 5/049; B60R 9/00; B60T 3/00; B60P 3/077; B64F 1/16; F16D 55/31; F16D 2125/28; A61G 3/08; A61G 3/0808; A61G 2203/80; F16B 2/10; F16B 2/12
See application file for complete search history.

(56) References Cited

U.S. PATENT DOCUMENTS

| | | | |
|---|---|---|---|
| 7,736,104 B2 * | 6/2010 | Hobson | A61G 3/0808 410/7 |
| 9,539,951 B1 * | 1/2017 | Levi | B60P 3/125 |
| 2001/0055520 A1 * | 12/2001 | Budd | A61G 3/08 410/7 |
| 2007/0246496 A1 * | 10/2007 | Reeves | B60R 9/10 224/403 |

(Continued)

FOREIGN PATENT DOCUMENTS

| | | | |
|---|---|---|---|
| CA | 2976552 A1 * | 5/2018 | B60P 3/07 |
| DE | 102013207796 A1 * | 10/2014 | B61D 45/00 |

(Continued)

OTHER PUBLICATIONS

Englished machined translation of DE-102013207796-A1, Oct. 2014.*

*Primary Examiner* — Robert A. Siconolfi
*Assistant Examiner* — San M Aung
(74) *Attorney, Agent, or Firm* — Christopher G. Darrow; Darrow Mustafa PC (57) ABSTRACT

A securement system for restricting rolling of a rollable cart residing on a ground surface includes a first mechanism including a first mechanism base defining a first cavity structured to receive a rolling element of the rollable cart therein while the rolling element is in direct contact with the ground surface. The first mechanism may also include a first mechanism blocking member operably coupled to the first mechanism base so as to be adjustably positionable to a closing position in which the first mechanism blocking member blocks a path of the rolling element out of the first cavity, and also to an opening position in which the first mechanism blocking member does not block the path of the rolling element out of the first cavity.

10 Claims, 5 Drawing Sheets

(56) References Cited

U.S. PATENT DOCUMENTS

| | | | | |
|---|---|---|---|---|
| 2008/0272565 A1* | 11/2008 | Fitzgerald | ............... | G07F 11/62 |
| | | | | 280/47.35 |
| 2010/0170754 A1* | 7/2010 | Brooks | ................ | B65G 69/005 |
| | | | | 188/32 |
| 2010/0171284 A1* | 7/2010 | Parks | ....................... | A61G 5/10 |
| | | | | 29/428 |
| 2012/0159768 A1* | 6/2012 | Johnson | ................... | F16B 2/10 |
| | | | | 403/187 |
| 2013/0292214 A1* | 11/2013 | Brooks | ............... | B65G 69/005 |
| | | | | 188/32 |

FOREIGN PATENT DOCUMENTS

| | | |
|---|---|---|
| JP | 2003326910 | 11/2003 |
| JP | 2003326911 | 11/2003 |

\* cited by examiner

POSITIONAL SECUREMENT SYSTEM FOR A ROLLABLE CART

TECHNICAL FIELD

The present invention relates to mechanisms and systems for securing rollable elements in a desired location and, more particularly, to a system for securing or fixing a rollable cart in a desired location on a floor surface during loading and unloading of the cart.

BACKGROUND

Rollable carts may be used in a manufacturing environment to transport items such as components and sub-assemblies between workstations. During loading and unloading of a cart, the cart may undesirably shift position, possibly causing elements to fall from the cart, or possibly causing injury to a user standing on the cart or on a floor surface close to the cart. The wheels of some carts do not have brakes for immobilizing the wheels, and even if brakes are installed on the wheels, the brakes may become worn or damaged and fail.

SUMMARY

In one aspect of the embodiments described herein, a securement system is provided for restricting rolling of a rollable cart residing on a ground surface. The system includes a first mechanism including a first mechanism base defining a first cavity structured to receive a rolling element of the rollable cart therein while the rolling element is in direct contact with the ground surface. The first mechanism may also include a first mechanism blocking member operably coupled to the first mechanism base so as to be adjustably positionable to a closing position in which the first mechanism blocking member blocks a path of the rolling element out of the first cavity, and also to an opening position in which the first mechanism blocking member does not block the path of the rolling element out of the first cavity.

BRIEF DESCRIPTION OF THE DRAWINGS

The accompanying drawings, which are incorporated in and constitute a part of this specification, illustrate embodiments described herein and together with the description serve to explain principles of embodiments described herein.

DETAILED DESCRIPTION

In one aspect of the embodiments described herein, a securement system is provided for restricting rolling of a rollable cart residing on a ground surface. The system includes a first mechanism including a first mechanism base defining a first cavity structured to receive a rolling element of the rollable cart therein while the rolling element is in direct contact with the ground surface. The first mechanism may also include a first mechanism blocking member operably coupled to the first mechanism base so as to be adjustably positionable to a closing position in which the first mechanism blocking member blocks a path of the rolling element out of the first cavity, and also to an opening position in which the first mechanism blocking member does not block the path of the rolling element out of the first cavity. The securement system may also include a second mechanism having a second mechanism base defining a second cavity structured to receive another rolling element of the rollable cart therein while the other rolling element is in direct contact with the ground surface. The second mechanism may also include a second mechanism blocking member operably coupled to the second mechanism base so as to be adjustably positionable to a closing position in which the second mechanism blocking member blocks a path of the other rolling element out of the second cavity, and also to an opening position in which the second mechanism blocking member does not block the path of the other rolling element out of the second cavity. When the first and second blocking members are in their respective opening positions, rolling elements (e.g., wheels) of the cart may be rolled along the ground surface and into the first and second cavities. The first and second blocking members may then be repositioned to their respective closing positions to prevent the rolling elements from exiting the first and second cavities, thereby preventing the cart from rolling until the blocking members are moved to release the rolling elements.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. Unless otherwise noted, similar reference characters are used to describe similar features on separate elements and/or embodiments. Any of the components described herein may be formed from a material (or materials) suitable for the purpose(s) of the element as described herein.

FIGS. 1A-4 show the structure and operation of a securement system (generally designated 20) for restricting rolling of a rollable cart 19 residing on a ground surface G1, in accordance with an embodiment described herein. The rollable cart 19 may be, for example, a transport dolly used for moving items in a manufacturing environment, or any other type of cart supported by wheels, casters, and/or other rolling elements structured to rotatable about respective support axes and rollable along a ground surface. The rolling element support axes may be vertical axes through which the respective rolling elements are attached to the cart and about which the rolling elements may rotate or spin in order to change direction (for example, in the nature of a rotatable caster or a wheel of a shopping cart) responsive to forces exerted on the cart 19.

The ground surface G1 may be any surface (other than surfaces of the elements of the wheel securement system) capable of supporting the rolling elements and the cart 19 and along which the rolling element can roll to enable movement of the cart (for example, a floor surface of a manufacturing or assembly plant or a paved foundation of a garage interior).

Figure 1A:
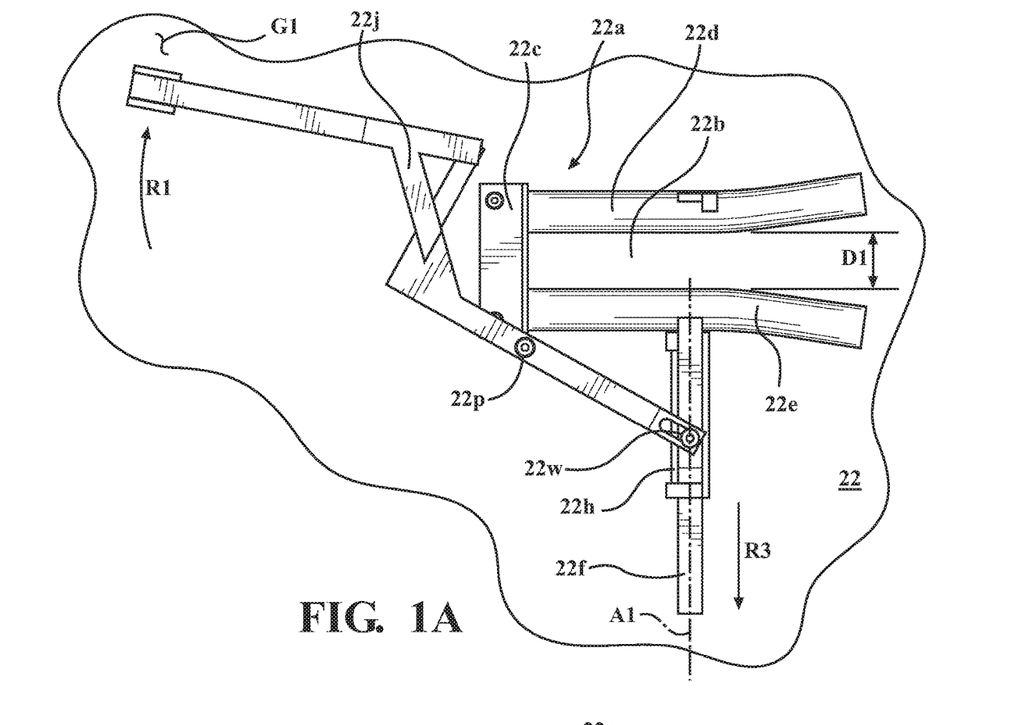
FIG. 1A is a schematic plan view of a first mechanism of a securement system for restricting rolling of a rollable cart in accordance with an embodiment described herein, showing a blocking member of the first mechanism in an opening position in which a rollable element of a rollable cart may be received in a cavity formed in the first mechanism.
Figure 1B:
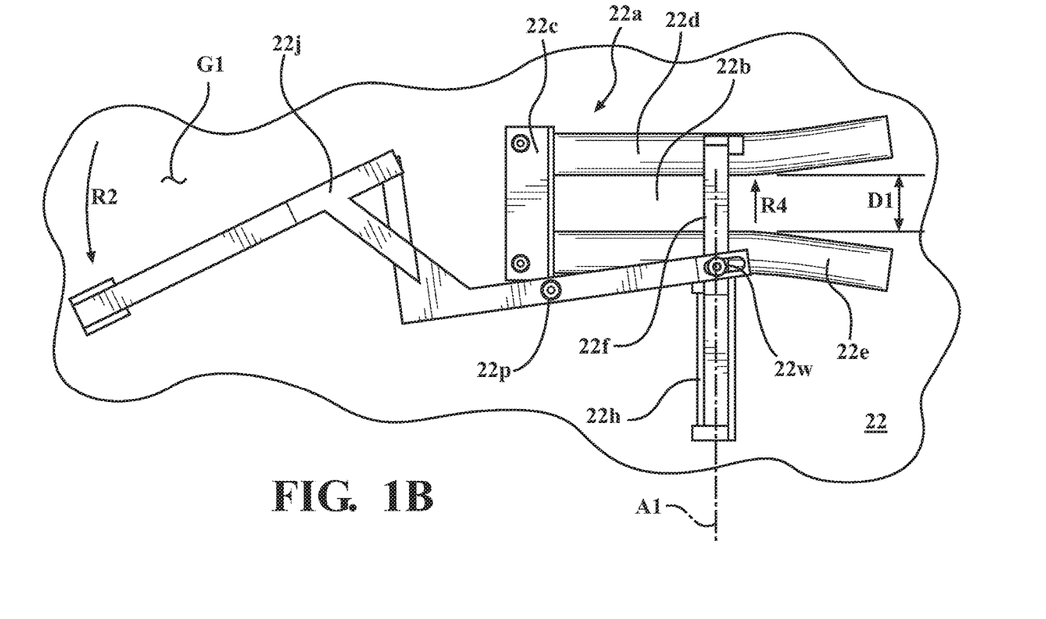
FIG. 1B is the schematic plan view of FIG. 1A showing the blocking member of the first mechanism in a closing position for blocking movement of the rolling element out of the cavity formed in the first mechanism.
Figure 1C:
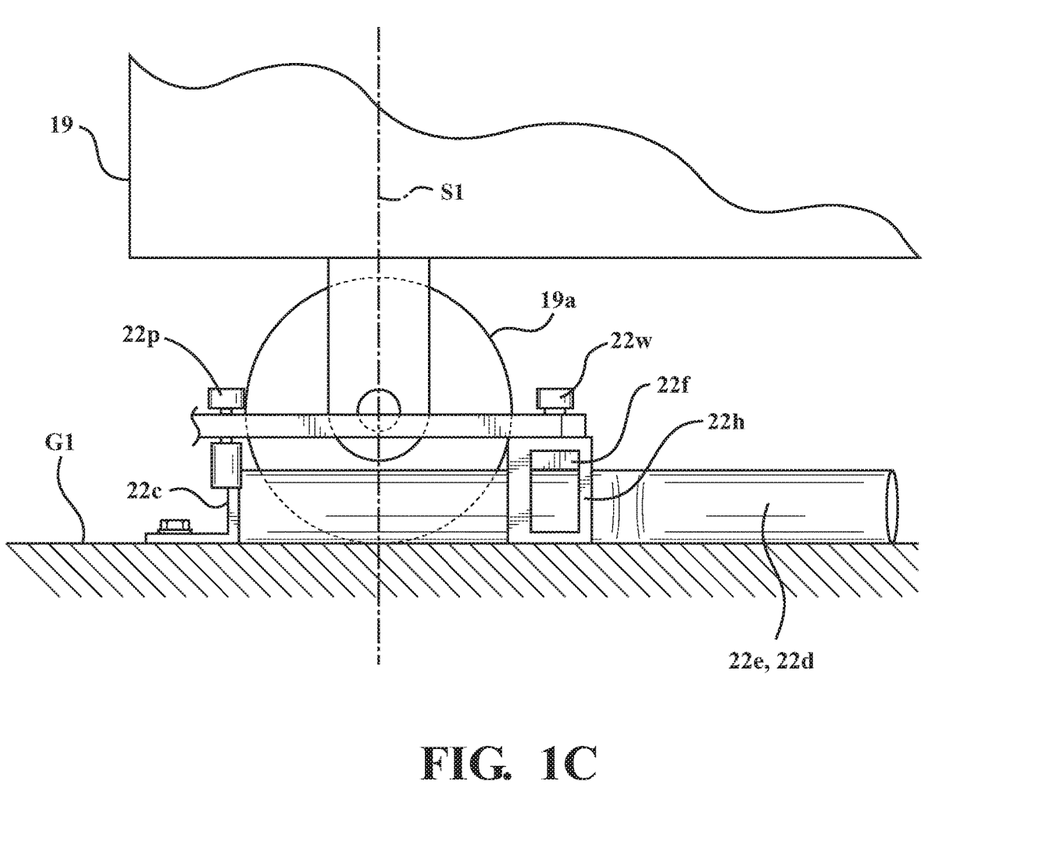
FIG. 1C is a schematic side view of the first mechanism of FIG. 1A showing positioning of a slidable blocking member of the first mechanism in relation to the rolling element of received in the cavity.

Referring to FIGS. 1A-1C, the securement system 20 may include a first mechanism 22 having a first mechanism base 22a defining a first cavity 22b structured to receive a rolling element 19a of the rollable cart 19 therein while the rolling element 19a is in direct or actual physical contact with the ground surface G1.

In one or more arrangements, the first mechanism base 22a may include a first wall portion 22c, a second wall portion 22d rigidly attached to and extending from the first wall portion 22c, and a third wall portion 22e rigidly attached to and extending from the first wall portion 22c opposite the second wall portion 22d. The first cavity 22b may reside between (and/or be defined by) the first wall portion 22c, second wall portion 22d, and third wall portion 22e. The second and third wall portions 22d, 22e may be tapered at ends thereof as shown or otherwise shaped to facilitate guidance of the rolling element 19a into the first cavity 22b. The second and third wall portions 22d, 22e may be spaced apart a minimum distance D1 large enough to enable rolling elements having a range of widths to be rolled into first cavity 22b, while also being small enough to prevent rotation of the rolling element 19a more than about 10° in either direction about a support axis S1 of the rolling element when the rolling element resides in the first cavity 22b. In addition, after the rolling element is confined within the first cavity 22b by movement of the blocking member 22f as described herein, the arrangement of the first mechanism base shown acts to restrict movement of the rolling element 19a, to prevent shifting of the cart during loading/unloading and enabling the rolling element 19a to function as a pivot about which the remainder of the cart may be rotated along the ground surface G1.

In one or more arrangements, the second and third wall portions 22d, 22e forming the first cavity 22b may extend straight out from and perpendicular to (or substantially perpendicular to) the first wall portion 22c. As used herein, the term "substantially" includes exactly the term it modifies and slight variations therefrom. Thus, the term "substantially perpendicular" means exactly perpendicular and slight variations therefrom. In this particular example, slight variations therefrom can include dimensions within normal manufacturing tolerances depending on the materials and methods used in fabricating the first, second and third wall portions and attaching the second and/or third wall portions to the first wall portion.

The first mechanism first, second, and third wall portions 22c, 22d, 22e may be formed from any materials (for example steel and/or polymers) suitable for the purposes described herein.

First mechanism base 22a may be structured for securement to the ground surface G1 using bolts, stakes, or any other suitable method, to secure the base 22a so that the base 22a remains in a desired location when subjected to forces exerted on the base by the rollable cart 19 during movement of the cart.

Referring to FIGS. 1A-1C, a first mechanism blocking member 22f may be operably coupled to the first mechanism base 22a so as to be adjustably positionable to an opening position in which the first mechanism blocking member does not block a path of the rolling element 19a out of the first cavity (as shown in FIG. 1A), and also to a closing position (as shown in FIG. 1B) in which the first mechanism blocking member 22f blocks the path of the rolling element 19a out of the first cavity 22b. A path of a rolling element out of a cavity of a mechanism is considered to be "blocked" by a blocking member when the blocking member prevents a rolling element received in the cavity from exiting the cavity. Similarly, a path of a rolling element out of a cavity is considered to be "unblocked" or "not blocked" by the blocking member when a rolling element received in the cavity is not prevented by the blocking member from exiting the cavity.

In an embodiment as shown in FIGS. 1A and 1B, the blocking member 22f may be adjustably positionable to a closing position extending between the second wall portion 22d and the third wall portion 22e, as shown in FIG. 1B.

In one or more arrangements, a first mechanism blocking member guide 22h may be coupled to the first mechanism base 22a. The blocking member 22f may be slidably or otherwise movably supported in the guide 22h so that the blocking member 22f can move between the closing and opening positions. For example, the first mechanism blocking member guide 22h may be attached to the first mechanism third wall portion 22e as shown in FIGS. 1A-1C. The guide 22h may extend along an axis A1 which is transverse to (and intersects) both the second wall portion 22d and the third wall portion 22e. In one or more arrangements, the first wall portion 22c may be straight and axis A1 may extend parallel or substantially parallel to the first wall portion.

In some embodiments, the first mechanism blocking member 22f may be mounted for direct contact by a user to move the blocking member between the closing and opening positions. For example, a user may physically touch the first mechanism blocking member 22f to move the member.

In some arrangements, a lever 22j may be operably coupled to the first mechanism base 22a and to the first mechanism blocking member 22f. The lever 22j may be operable to move the blocking member 22f between the closing position and the opening position. For example, in the embodiment shown in FIGS. 1A-1C, lever 22j is rotatably coupled to the first mechanism base 22a at a pivot 22p and also rotatably coupled to the blocking member 22f at rotatable connection 22w. The blocking member 22f may be structured to be slidable within the blocking member guide 22h to move the blocking member 22f between the closing position and the opening position responsive to operation (i.e., rotation) of the lever 22j. The lever 22j may be structured to be operable by a foot of a user, to move the blocking member 22f between the closing position and the opening position.

Figure 2A:
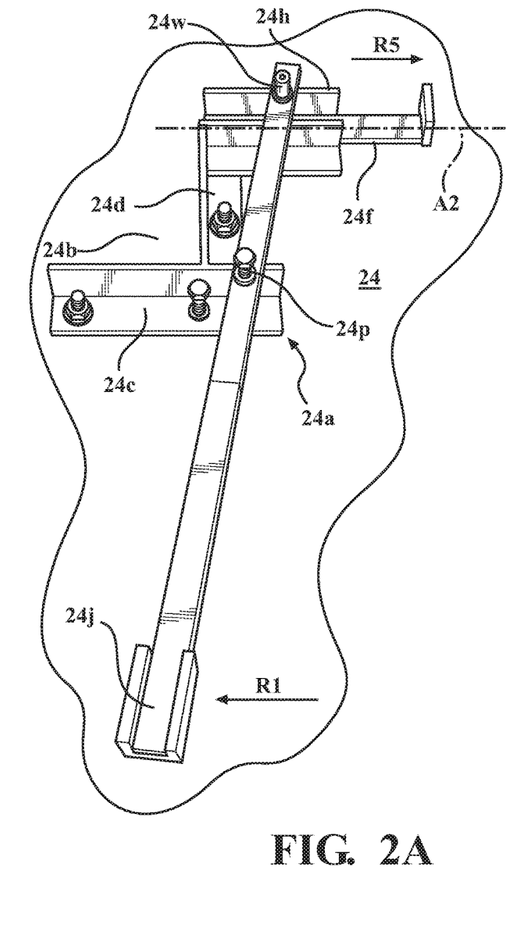
FIG. 2A is a schematic plan view of a second mechanism of the securement system, showing a blocking member of the second mechanism in an opening position in which another rollable element of the rollable cart may be received in a cavity formed in the second mechanism.
Figure 2B:
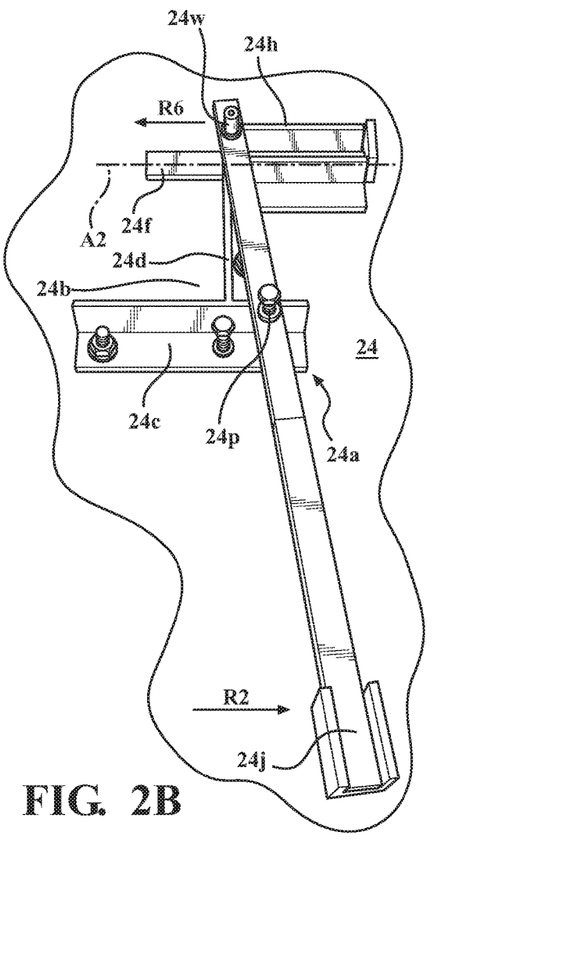
FIG. 2B is the schematic plan view of FIG. 2A showing the blocking member of the second mechanism in a closing position for blocking movement of the other rolling element out of the cavity formed in the second mechanism.

Referring to the drawings, and in particular to FIGS. 2A and 2B, the securement system 20 may also include a second mechanism 24 having a second mechanism base 24a defining a second cavity 24b structured to receive another rolling element 19b of the rollable cart therein while the other rolling element 19b is in direct contact with the ground surface G1.

In one or more arrangements, the second mechanism base 24a may include a first wall 24c portion and a second wall portion 24d rigidly attached to and extending from the first wall portion. The second cavity 24b may reside between the first and second wall portions 24c, 24d.

In one or more arrangements, the second wall portion 24d may extend perpendicularly or substantially from the first wall portion 24c. The second mechanism first and second wall portions 24c, 24d may be formed from any materials (for example steel and/or polymers) suitable for the purposes described herein.

Second mechanism base 24a may be structured for securement to the ground surface G1 using bolts, stakes, or any other suitable method, to secure the base 24a so that the base remains in a desired location when subjected to forces exerted on the base 24a by the rollable cart 19 during movement of the cart.

Referring to FIGS. 2 and 2A, a second mechanism blocking member 24f may be operably coupled to the second mechanism base 24a so as to be adjustably positionable to an opening position (as shown in FIG. 2A) in which the second mechanism blocking member does not block a path of the rolling element 19b out of the second cavity 24b, and also to a closing position (as shown in FIG. 2B) in which the second mechanism blocking member blocks the path of the rolling element 19b out of the second cavity 24b. The blocking member 24f may be adjustably positionable to a closing position extending from the second wall portion 24d.

In one or more arrangements, a second mechanism blocking member guide 24h may be coupled to the second mechanism base 24a. The blocking member 24f may be slidably or otherwise movably supported in the guide 24h so that the blocking member 24f can move between the closing and opening positions. For example, the second mechanism blocking member guide 24h may be attached to the second mechanism first wall portion 24c as shown in FIGS. 2A, 2B. The guide 24h may extend along an axis A2 which is transverse to the second wall portion 24d. In one or more arrangements, the first wall portion 24c may be straight and axis A2 may extend parallel or substantially parallel to the first wall portion.

In some embodiments, the second mechanism blocking member 24f may be mounted for direct contact by a user to move the blocking member between the closing and opening positions. For example, a user may physically touch the first mechanism blocking member 24f to move the member.

In some arrangements, a lever 24j may be operably coupled to the second mechanism base 24a and to the second mechanism blocking member 24f. The lever 24j may be operable to move the blocking member 24f between the closing position and the opening position. For example, in the embodiment shown in FIGS. 2A and 2B, the lever 24j is rotatably coupled to the first mechanism base 24a at a pivot 24p and also to the blocking member 24f at location 24w. The blocking member 24f may be structured to be slidable within the blocking member guide 24h to move the blocking member 24f between the closing position and the opening position responsive to operation of the lever 24j. The lever 24j may be structured to be operable by a foot of a user, to move the blocking member 24f between the closing position and the opening position.

Figure 3:
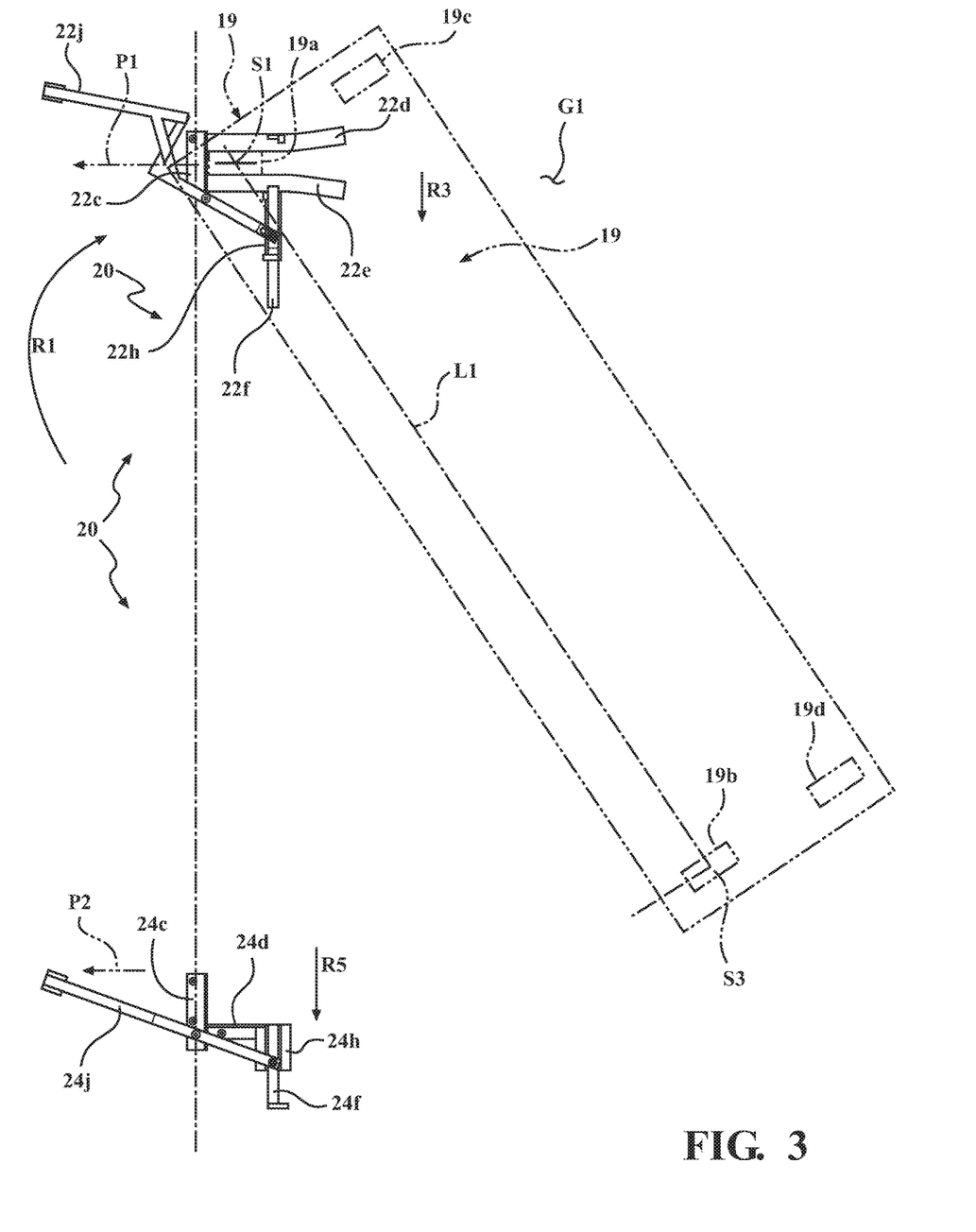
FIG. 3 is a schematic plan view showing the first and second mechanisms of the securement system spaced apart and secured to a ground surface for receiving respective rolling elements of a rollable cart therein, and showing operation of the first mechanism of the securement system.
Figure 4:
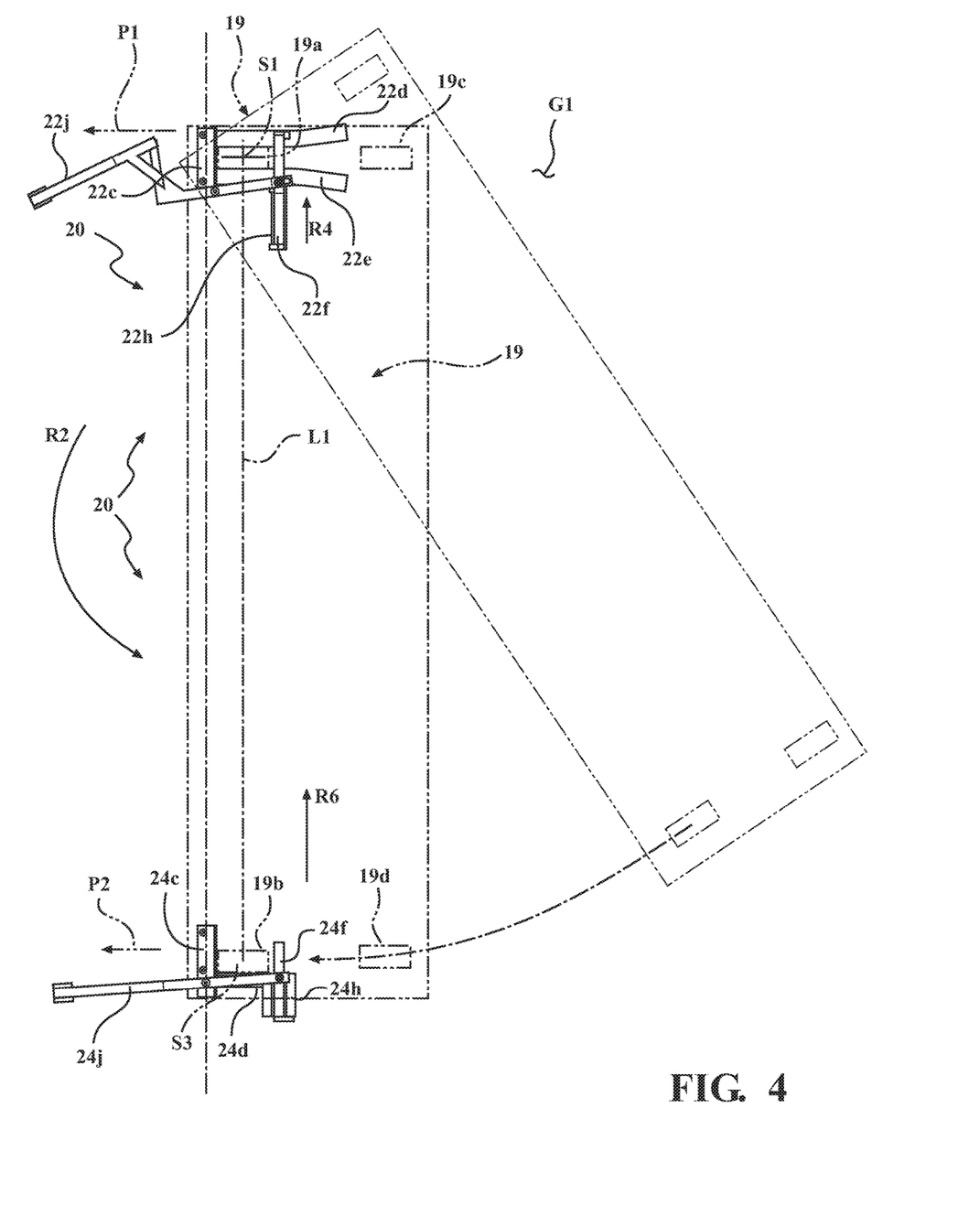
FIG. 4 is the schematic plan view of FIG. 3 showing operation of the second mechanism of the securement system.

Operation of the embodiment of the securement system 20 shown in FIGS. 1A-2B is illustrated in FIGS. 3 and 4. The first and second mechanisms 22 and 24 may be positioned spaced apart a distance D2 corresponding to a spacing between support axes S1 and S3 of rollable cart rolling elements 19a, 19b to be inserted into the first and second mechanism cavities 22b, 24b, respectively. For example, for rolling elements 19a, 19b of equal widths, the spacing may be equal or approximately equal to the length of a line L1 connecting the axes of support X1 and X2 of the rolling elements. Additional rolling elements 19c, 19d of the cart 19 are also shown.

The first and second mechanisms 22, 24 may then be secured in their respective positions to the ground surface G1 such that paths leading into the cavities 22b, 24b face in parallel directions P1 and P2. With the first mechanism blocking member 22f in the opening position, the cart 19 may then be moved so as to guide the first rolling element 19a into the first mechanism cavity 22b. Lever 22j may then be rotated in direction R2 (FIG. 1B) to move the first mechanism blocking member 22f in direction R4 to the closing position behind the rolling element 19a. The first rolling element 19a is now confined within the first mechanism first cavity 22b.

Referring to FIG. 4, the cart 19 may then be moved so as to guide the other rolling element 19b into the second mechanism cavity 24b. To do this, the cart 19 may be pivoted about the confined first rolling element 19a until the other rolling element 19b moves into the second mechanism second cavity 24b. Confinement of the first rolling element within cavity 22b enables the first rolling element 19a to serve as a pivot about which the cart 19 may be rotated. Second mechanism blocking member 24f may then be moved in direction R6 to the closing position behind the other rolling element by rotation of the lever 24j in direction R1. The other rolling element 19b is now confined within the second mechanism second cavity 24b, thereby preventing the cart 19 from moving along the ground surface G1. The cart 19 may now be safely loaded and unloaded without appreciable movement.

Referring again to FIG. 3, to release the rolling elements 19a, 19b, the blocking members 22f, 24f may be moved to their respective opening positions. Specifically, the first mechanism lever 22j may be rotated in direction R1 opposite R2 to move the blocking member 22f in direction R3 opposite the direction R4, thereby opening the first cavity 22b. Also, the second mechanism lever 24j may be rotated in direction R1 to move the blocking member 24f in direction R5 opposite direction R6, thereby opening the cavity 24b.

In alternative arrangements, the first mechanism 22 may be secured to the ground surface G1 so as to be rotatable about a vertical axis passing through a first fixed location on the ground surface. In such arrangements, the second mechanism 24 may be secured to the ground surface G1 so as to be rotatable about a vertical axis passing through a second fixed location on the ground surface spaced apart from the first location, or the second mechanism may be secured to the ground surface G1 so as to be non-rotatable about the second fixed location. Rotatably coupling one or both of the first and second mechanisms 22, 24 to the ground surface G1 may aid in maneuvering a rolling element into the first and/or second mechanism cavities in cases where one or more rolling elements of the rollable cart 19 do not rotate freely about their respective support axes.

For example, a rolling element of the cart 19 may be directed to a location close to a rotatably mounted first mechanism 22, and the first mechanism 22 may be rotated to align a path of the rolling element into the first cavity 22b with a current rolling direction of the rolling element. The rolling element may then be rolled into the first cavity 22b and the blocking member 22f moved to the closing position to secure the rolling element within the first cavity 22b. The cart may then be maneuvered to bring another rolling element into the cavity 24b formed in the second mechanism 24, as previously described. Rotatably coupling the second mechanism 24 to the ground surface G1 may facilitate entry of the other rolling element into the second mechanism cavity in the same manner. When the rolling elements are secured within the first and second mechanism cavities 22b, 24b, movement of the cart 19 along the ground surface G1 is prevented or substantially restricted by the first and second mechanism blocking members 22f, 24f and by friction between the immobilized rolling element and the ground surface G1.

In the above detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A securement system for restricting rolling of a rollable cart residing on a ground surface, the system comprising:
   a first mechanism including a first mechanism base, the base including a first wall portion, a second wall portion extending from the first wall portion, and a third wall portion extending from the first wall portion opposite the second wall portion, the first, second, and third wall portions combining to define a first cavity structured to receive a rolling element of the rollable cart therein while the rolling element is in direct contact with the ground surface; and
   a first mechanism blocking member operably coupled to the first mechanism base so as to be adjustably positionable to a closing position extending from the third wall portion to the second wall portion and in which the first mechanism blocking member blocks a path of the rolling element out of the first cavity, and also to an opening position in which the first mechanism blocking member does not block the path of the rolling element out of the first cavity.

2. The securement system of claim 1 further comprising a first mechanism lever operably coupled to the base and to the first mechanism blocking member, wherein the first mechanism lever is structured to be operable to move the first mechanism blocking member between the closing position and the opening position.

3. The securement system of claim 2 further comprising a first mechanism blocking member guide coupled to the first mechanism base, wherein the first mechanism blocking member is structured to be slidable within the first mechanism blocking member guide to move the first mechanism blocking member between the closing position and the opening position responsive to operation of the first mechanism lever.

4. The securement system of claim 1 further comprising:
   a second mechanism having a second mechanism base defining a second cavity separate from the first cavity and structured to receive another rolling element of the rollable cart therein while the other rolling element is in direct contact with the ground surface; and
   a second mechanism blocking member operably coupled to the second mechanism base so as to be adjustably positionable to a closing position in which the second mechanism blocking member blocks a path of the other rolling element out of the second cavity, and also to an opening position in which the second mechanism blocking member does not block the path of the other rolling element out of the second cavity.

5. The securement system of claim 4 wherein the second mechanism base includes a first wall portion separate from the first mechanism first wall portion and a second wall portion extending from the first wall portion, wherein the second cavity resides between the first and second wall portions, and wherein the second mechanism blocking member is adjustably positionable to a closing position extending from the second wall portion.

6. The securement system of claim 4 further comprising a second mechanism lever operably coupled to the second mechanism base and to the second mechanism blocking member, wherein the second mechanism lever is structured to be operable to move the second mechanism blocking member between the closing position and the opening position.

7. The securement system of claim 6 further comprising a second mechanism blocking member guide coupled to the second mechanism base, wherein the second mechanism blocking member is structured to be slidable within the second mechanism blocking member guide to move the second mechanism blocking member between the closing position and the opening position responsive to operation of the second mechanism lever.

8. The securement system of claim 4 wherein the first mechanism is coupled to the ground surface so as to be rotatable about a vertical axis passing through a first fixed location on the ground surface.

9. The securement system of claim 8 wherein the second mechanism is coupled to the ground surface so as to be rotatable about a vertical axis passing through a second fixed location on the ground surface spaced apart from the first fixed location.

10. The securement system of claim 8 wherein the second mechanism is coupled to the ground surface so as to be rotatable about a vertical axis passing through a second fixed location on the ground surface spaced apart from the first fixed location.

* * * * *